(12) United States Patent
Zhamu et al.

(10) Patent No.: US 11,870,051 B2
(45) Date of Patent: Jan. 9, 2024

(54) METHOD OF IMPROVING FAST-CHARGEABILITY OF A LITHIUM-ION BATTERY

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 171 days.

(21) Appl. No.: 16/038,814

(22) Filed: Jul. 18, 2018

(65) Prior Publication Data
US 2020/0028147 A1    Jan. 23, 2020

(51) Int. Cl.
*H01M 4/04* (2006.01)
*H01M 4/133* (2010.01)
*H01M 4/1391* (2010.01)
*H01M 4/1393* (2010.01)
*H01M 10/0525* (2010.01)
*H01M 4/131* (2010.01)
*H01M 4/02* (2006.01)

(52) U.S. Cl.
CPC ....... *H01M 4/0404* (2013.01); *H01M 4/0428* (2013.01); *H01M 4/131* (2013.01); *H01M 4/133* (2013.01); *H01M 4/1391* (2013.01); *H01M 4/1393* (2013.01); *H01M 10/0525* (2013.01); *H01M 2004/027* (2013.01)

(58) Field of Classification Search
CPC .. H01M 4/0404; H01M 4/0428; H01M 4/131; H01M 4/133; H01M 4/1391; H01M 4/1393; H01M 10/0525; H01M 2004/027
See application file for complete search history.

(56) References Cited

U.S. PATENT DOCUMENTS

| 1,096,859 | A |  | 5/1914 | Putter |  |
| 2014/0363746 | A1 | * | 12/2014 | He | H01M 10/052 429/406 |

(Continued)

FOREIGN PATENT DOCUMENTS

| JP | 2007265712 A | 10/2007 |
| KR | 1020140078027 A | 6/2014 |

(Continued)

OTHER PUBLICATIONS

Chen et al., "Three-dimensional Flexible and Conductive Interconnected Graphene Networks Grown by Chemical Vapor Deposition" Nature Materials (2011) vol. 10, pp. 424-428.

(Continued)

*Primary Examiner* — Amanda C. Walke

(57) ABSTRACT

Provided is a method of improving fast-chargeability of a lithium secondary battery containing an anode, a cathode, a porous separator disposed between the anode and the cathode, and an electrolyte, wherein the method comprises packing particles of an anode active material to form an anode active material layer having interstitial spaces and disposing a lithium ion reservoir in the interstitial spaces, configured to receive lithium ions from the cathode through the porous separator when the battery is charged and to enable the lithium ions to enter the particles of anode active material in a time-delayed manner.

18 Claims, 5 Drawing Sheets

(56) References Cited

U.S. PATENT DOCUMENTS

| | | | |
|---|---|---|---|
| 2015/0318530 A1* | 11/2015 | Yushin | H01M 12/00 |
| | | | 429/131 |
| 2016/0019995 A1 | 1/2016 | Zhamu et al. | |
| 2016/0211548 A1* | 7/2016 | Jin | H01M 10/0525 |
| 2017/0009292 A1 | 1/2017 | Vockley et al. | |
| 2017/0092921 A1* | 3/2017 | Matsumura | H01M 4/525 |
| 2017/0294644 A1* | 10/2017 | Burshtain | H01M 4/624 |
| 2018/0174766 A1 | 6/2018 | Zhamu et al. | |
| 2020/0044278 A1 | 2/2020 | Zhang et al. | |

FOREIGN PATENT DOCUMENTS

| | | | |
|---|---|---|---|
| WO | 2012087698 A1 | 6/2012 | |
| WO | 2013145925 A1 | 10/2013 | |
| WO | WO-2018175300 A1 * | 9/2018 | H01M 2/145 |

OTHER PUBLICATIONS

Choi et al., "3D Macroporous Graphene Frameworks for Supercapacitors with High Energy and Power Densities" ACS Nano (2012) vol. 6, pp. 4020-4028.

Xu et al., "Self-Assembled Graphene Hydrogel via a One-Step Hydrothermal Process" ACS Nano (2010) vol. 4, No. 7, pp. 4324-4330.

PCT/US19/42311 International Search Report and Written Opinion dated Nov. 8, 2019, 10 pages.

U.S. Appl. No. 16/038,798 Nonfinal Office Action dated Feb. 17, 2021, 16 pages.

U.S. Appl. No. 16/038,798; Non Final Office Action dated Jan. 23, 2023; 29 pages.

* cited by examiner

METHOD OF IMPROVING FAST-CHARGEABILITY OF A LITHIUM-ION BATTERY

FIELD OF THE INVENTION

The present invention provides a fast-chargeable lithium-ion battery.

BACKGROUND

Rechargeable lithium-ion (Li-ion) and rechargeable lithium metal batteries (e.g. lithium-sulfur, lithium-selenium, and Li metal-air batteries) are considered promising power sources for electric vehicle (EV), hybrid electric vehicle (HEV), and portable electronic devices, such as laptop computers and mobile phones. Lithium as a metal element has the highest lithium storage capacity (3,861 mAh/g) compared to any other metal or lithium intercalation compound as an anode active material (except $Li_{4.4}Si$, which has a specific capacity of 4,200 mAh/g). Hence, in general, Li metal batteries (having a lithium metal anode) have a significantly higher energy density than lithium-ion batteries (e.g. having a graphite anode).

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode to the cathode through the electrolyte and the cathode became lithiated. Unfortunately, upon repeated charges and discharges, the lithium metal resulted in the formation of dendrites at the anode that ultimately caused internal shorting, thermal runaway, and explosion. As a result of a series of accidents associated with this problem, the production of these types of secondary batteries was terminated in the early 1990's giving ways to lithium-ion batteries.

Even now, cycling stability and safety concerns remain the primary factors preventing the further commercialization of Li metal batteries (e.g. Lithium-sulfur and Lithium-transition metal oxide cells) for EV, HEV, and microelectronic device applications. Again, cycling stability and safety issues of lithium metal rechargeable batteries are primarily related to the high tendency for Li metal to form dendrite structures during repeated charge-discharge cycles or overcharges, leading to internal electrical shorting and thermal runaway. This thermal runaway or even explosion is caused by the organic liquid solvents used in the electrolyte (e.g. carbonate and ether families of solvents), which are unfortunately highly volatile and flammable.

Many attempts have been made to address the dendrite and thermal runaway issues. However, despite these earlier efforts, no rechargeable Li metal batteries have succeeded in the market place. This is likely due to the notion that these prior art approaches still have major deficiencies. For instance, in several cases, the anode or electrolyte structures designed for prevention of dendrites are too complex. In others, the materials are too costly or the processes for making these materials are too laborious or difficult. In most of the lithium metal cells and lithium-ion cells, the electrolyte solvents are flammable. An urgent need exists for a simpler, more cost-effective, and easier to implement approach to preventing Li metal dendrite-induced internal short circuit and thermal runaway problems in Li metal batteries and other rechargeable lithium batteries.

These concerns over the safety of earlier lithium metal secondary batteries led to the development of lithium-ion batteries, in which pure lithium metal sheet or film was replaced by carbonaceous materials (e.g. natural graphite particles) as the anode active material. The carbonaceous material absorbs lithium (through intercalation of lithium ions or atoms between graphene planes, for instance) and desorbs lithium ions during the re-charge and discharge phases, respectively, of the lithium-ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost, safety, and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range from 140-170 mAh/g. As a result, the specific energy of commercially available Li-ion cells is typically in the range from 120-220 Wh/kg, most typically 150-180 Wh/kg. These specific energy values are two to three times lower than what would be required for battery-powered electric vehicles to be widely accepted.

Furthermore, the same flammable solvents previously used for lithium metal secondary batteries are also used in most of the lithium-ion batteries. Despite the notion that there is significantly reduced propensity of forming dendrites in a lithium-ion cell (relative to a lithium metal cell), the lithium-ion cell can still suffer from formation of lithium dendrite particularly when the lithium-ion battery is subjected to repeated charges/discharges at high rates. Under high charge rate conditions, for instance, the lithium ions returning from the cathode could find themselves not being capable of rapidly diffusing into the interior of anode active material particles; instead, the lithium ions get plated on particle surfaces to become lithium metal, often in a non-uniform manner, leading to dendrite formation.

A specific object of the present invention is to provide a lithium-ion battery that can be rapidly recharged and exhibits a high specific energy, a long cycle-life, and a high level of safety.

A very important object of the present invention is to provide a simple, cost-effective, and easy-to-implement approach to preventing potential Li metal dendrite-induced internal short circuit and thermal runaway problems in various fast-charging Li-ion batteries.

SUMMARY OF THE INVENTION

The present invention provides a lithium secondary battery containing an anode, a cathode, a porous separator disposed between the anode and the cathode, and an electrolyte, wherein the anode comprises particles of an anode active material that are packed together to form an anode active material layer having interstitial spaces to accommodate a lithium ion reservoir disposed therein and configured to receive lithium ions from the cathode through the porous separator when the battery is charged and enable the lithium ions to enter the particles of anode active material in a time-delayed manner, wherein the lithium ion reservoir comprises lithium-capturing groups dispersed in a fluid residing in these interstitial spaces and the lithium-capturing groups are selected from (a) redox forming species that reversibly form a redox pair with a lithium ion when the battery is charged; (b) electron-donating groups interspaced between non-electron-donating groups; (c) anions and cations wherein the anions are more mobile than the cations; (d) chemical reducing groups that partially reduce lithium ions from $Li^{+1}$ to $Li^{+\delta}$, wherein $0<\delta<1$; (e) an ionic liquid; (f) borate salt or phosphate salt; or (g) a combination thereof.

In some embodiments, the interstitial spaces occupy a volume fraction of the anode active material layer from 20% to 75%, preferably from 30% to 50%. In certain embodiments, the lithium ion capturing groups occupy from 5% to 60% by volume of the anode active material layer.

In some embodiments, the anode active material layer contains no resin binder that bonds the particles of active material together. Such a binder-free electrode is in contrast to conventional lithium-ion battery electrodes that require the use of a resin binder (e.g. PVDF, SBR, etc.) to bond active material particles to form an active material electrode layer of structural integrity and to bond this active material layer to a current collector (e.g. Cu foil for an anode or Al foil for the cathode). Such a binder-free electrode is herein made possible when the anode active material layer contains an electrically conductive porous layer having pores to accommodate the particles of anode active material therein. In certain embodiments, the electrically conductive porous layer and the anode active material layer substantially have the same dimensions. In other words, the anode active material layer has this conductive porous layer as a backbone or framework and the active material particles, along with the lithium ion reservoir and optional conductive additive, reside in pores of this porous layer.

The electrically conductive porous layer may be selected from metal foam, metal web or screen, perforated metal sheet-based structure, metal fiber mat, metal nanowire mat, conductive polymer nanofiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or a combination thereof.

The lithium secondary battery can be a lithium-ion battery wherein the anode contains particles of graphite, Si, $SiO_x$, Sn, $SnO_2$, Ge, etc. as the main anode active material. The battery may be a rechargeable lithium metal battery, such as a lithium-sulfur battery, a lithium-selenium battery, or a lithium-air battery, wherein the anode contains lithium metal (e.g. Li foil) or lithium metal alloy (containing at least 60% by weight of Li element).

In some embodiments, the lithium-capturing group is selected from a molecule having a core or backbone structure and at least a side group that is ionic or electron rich. The core or backbone structure may contain an aryl, heterocycloalkyl, crown etheryl, cyclamyl, cyclenyl, 1,4,7-Triazacyclononayl, hexacyclenyl, cryptandyl, naphtalenyl, antracenyl, phenantrenyl, tetracenyl, chrysenyl, tryphenylenyl, pyrenyl, pentacenyl, single-benzene or cyclic structure, double-benzene or bi-cyclic structure, or multiple-cyclic structure having 3-10 benzene rings.

The side group may contain $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano, $CF_3$, or $Si(OR)_3$; wherein R is independently selected from methyl, ethyl, isopropyl, n-propyl, alkyl, haloalkyl, cycloalkyl, heterocycloalkyl, aryl, or benzyl; $M^1$ is selected from Li, Na, K, Rb, or Cs; and $M^2$ is selected from Be, Mg, Ca, Sr, or Ba. These side groups, when attached to a cyclic core/backbone structure having 1-5 benzene rings, appear to be capable of partially or tentatively reducing lithium ions in the reservoir from $Li^{+1}$ to $Li^{+\delta}$, wherein $0<\delta<1$.

In some specific embodiments, the redox pair with lithium is selected from lithium 4-methylbenzenesulfonate, lithium 3,5-dicarboxybenzenesulfonate, lithium 2,6-dimethylbenzene-1,4-disulfonate, 3,3'-((1,2-dithiane-4,5-diyl)bis(oxy))bis(N-hydroxypropanamide), 3,3'-((4-mercapto-1,2-phenylene)bis(oxy))bis(N-hydroxypropanamide), lithium aniline sulfonate, poly(lithium-4-styrenesulfonate, lithium sulfate, lithium phosphate, lithium phosphate monobasic, lithium trifluoromethanesulfonate, lithium 1,1,2,2,3,3,4,4,5,5,6,6,7,7,8,8,8-heptadecafluorooctane-1-sulfonate, lithium 2,6-di-tert-butylbenzene-1,4-disulfonate, lithium aniline sulfonate (wherein the sulfonate may be in any of para, meta and ortho positions), poly(lithium-4-styrenesulfonate, or a combination thereof.

Electron-donating groups may be selected from those molecules having one to 10 benzene rings or cyclic structure as the core/backbone portion having conjugated double bonds, acidic groups, etc. Examples include sodium 4-methylbenzenesulfonate, sodium 3,5-dicarboxybenzenesulfonate, sodium 2,6-dimethylbenzene-1,4-disulfonate, and sodium aniline sulfonate. These molecules in the lithium ion reservoir appear to be capable of partially reducing the incoming lithium ions that pass through the porous separator from the cathode.

The lithium ion-capturing group may contain a salt that is dissociated into an anion and a cation in a liquid medium (typically an organic solvent). Non-limiting examples of these salts are $Li_2CO_3$, $Li_2O$, $Li_2C_2O_4$, $LiOH$, $LiX$, $ROCO_2Li$, $HCOLi$, $ROLi$, $(ROCO_2Li)_2$, $(CH_2OCO_2Li)_2$, $Li_2S$, $Li_xSO_y$, $Na_2CO_3$, $Na_2O$, $Na_2C_2O_4$, $NaOH$, $NaX$, $ROCO_2Na$, $HCONa$, $RONa$, $(ROCO_2Na)_2$, $(CH_2OCO_2Na)_2$, $Na_2S$, $Na_xSO_y$, or a combination thereof, wherein X=F, Cl, I, or Br, R=a hydrocarbon group, $0<x\leq1$, $1\leq y\leq4$. The liquid medium to dissolve these salts may contain a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, Hydrofluoro ether (HFE), Trifluoro propylene carbonate (FPC), Methyl nonafluorobutyl ether (MFE), Fluoroethylene carbonate (FEC), Tris(trimethylsilyl)phosphite (TTSPi), Triallyl phosphate (TAP), Ethylene sulfate (DTD), 1,3-propane sultone (PS), Propene sultone (PES), Diethyl carbonate (DEC), Alkylsiloxane (Si—O), Alkyylsilane (Si—C), liquid oligomeric silaxane (—Si—O—Si—), Ttetraethylene glycol dimethylether (TEGDME), an ionic liquid solvent, or a combination thereof.

The lithium ion-capturing groups may contain ionic liquids, which are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The desired ionic liquids for use in the presently invented lithium ion reservoir preferably have a melting point lower than 60° C., more preferably lower than 0° C., and further more preferably lower than −20° C. The IL salts are characterized by weak interactions, due to the combination of a large cation and a charge-delocalized anion. This results in a low tendency to crystallize due to flexibility (anion) and asymmetry (cation). The anions of the ionic liquid may be selected to be more mobile than the cations.

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

In some embodiments, prior to being incorporated into the anode active material layer, the particles of anode active material are coated with molecules selected from lithium 4-methylbenzenesulfonate, lithium 3,5-dicarboxybenzenesulfonate, lithium 2,6-dimethylbenzene-1,4-disulfonate, 3,3'-((1,2-dithiane-4,5-diyl)bis(oxy))bis(N-hydroxypropanamide), 3,3'-((4-mercapto-1,2-phenylene)bis(oxy)) bis (N-hydroxypropanamide), lithium aniline sulfonate, poly (lithium-4-styrenesulfonate, lithium sulfate, lithium phosphate, lithium phosphate monobasic, lithium trifluoromethane-sulfonate, lithium 1,1,2,2,3,3,4,4,5,5,6,6,7,7,8,8,8-heptadecafluorooctane-1-sulfonate, lithium 2,6-di-tert-butylbenzene-1,4-disulfonate, lithium aniline sulfonate (wherein the sulfonate may be in any of para, meta and ortho positions), poly(lithium-4-styrenesulfonate, or a combination thereof. These species work well when the lithium ion reservoir contains an ionic liquid as a lithium ion-capturing group.

Also provided in this invention is a method of improving fast-chargeability of a lithium secondary battery containing an anode, a cathode, a porous separator disposed between the anode and the cathode, and an electrolyte, wherein the method comprises packing particles of an anode active material to form an anode active material layer having interstitial spaces and disposing a lithium ion reservoir in the interstitial spaces, configured to receive lithium ions from the cathode through the porous separator when the battery is charged and to enable the lithium ions to enter the particles of anode active material in a time-delayed manner.

The present invention also provides a process for producing the aforementioned fast-chargeable lithium-ion battery. In some embodiments, the process comprises:
(a) forming an anode active material layer by (i) mixing particles of an anode active material with an ionic liquid or with lithium-capturing groups dispersed in a liquid medium to form a lithium ion-capturing fluid; and (ii) shaping the lithium ion-capturing fluid into the anode active material layer in such a manner that this layer comprises the anode active material particles that are packed together to form interstitial spaces that accommodate the lithium ion fluid disposed therein as lithium ion reservoir; and
(b) combining the anode active material layer, an electrolyte (electrolyte A) with an optional separator, and a cathode to form a lithium-ion cell.

The liquid medium may contain a solvent or an electrolyte (electrolyte B) that is the same or, preferably, different in composition than the intended electrolyte (electrolyte A) of the battery cell. The ionic liquid itself can be a lithium ion-capturing species and, as a liquid, can by itself be the lithium ion reservoir when confined in the interstitial spaces.

In some embodiments, the interstitial spaces occupy a volume fraction of the anode active material layer from 20% to 75%, preferably from 30% to 50%. Preferably, the sizes of the anode active material particles are from 5 nm to 100 nm and step (a) in the process comprises exerting a compression stress to consolidate the anode active material layer (e.g. using roll-pressing) to the extent that the interconnecting channels between the interstitial spaces are smaller than 20 nm in size (preferably smaller than 10 nm) so that the lithium ion capturing groups lodged therein cannot readily diffuse out; enabling the battery to maintain the fast-charging capability for an extended period of time.

In some embodiments, the electron-conducting porous structure has pore walls comprising an electron-conducting material selected from carbon nanotubes, carbon nanofibers, graphene sheets, expanded graphite platelets, carbon fibers, graphite fibers, graphite particles, needle coke, mesocarbon microbeads, carbon particles, carbon black, acetylene black, activated carbon particles, or a combination thereof. Multiple fibers or particles of electron-conducting materials optionally may be bonded by a resin binder (0.1%-10%) to improve the structural integrity of the porous structure. This binder resin is not for use to bond particles of anode active material together. Preferably, the electron-conducting porous structure contains a graphene foam.

In some embodiments, the lithium ion-conducting polymer is selected from sulfonated polyaniline, sulfonated polypyrrole, a sulfonated polythiophene, sulfonated polyfuran, a sulfonated bi-cyclic polymer, or a combination thereof.

In the lithium-ion battery, the anode (sometimes referred to as anode electrode) typically is composed of an anode active material, a conductive additive (e.g. carbon black, acetylene black, graphite platelets, carbon nanotubes, etc.), and an optional resin binder (e.g. the well-known SBR rubber, PVDF, CMC, etc.). In some embodiments, the anode electrode may comprise an anode active material comprising an element selected from Si, Ge, Sn, Cd, Sb, Pb, Bi, Zn, Al, Co, Ni, Ti, or an alloy thereof.

In some embodiments, the anode comprises an anode active material selected from the group consisting of:
a) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd);
b) lithiated and un-lithiated alloys or intermetallic compounds of Si, Ge, Sn, Pb, Sb, Bi, Zn, Al, Ti, Ni, Co, or Cd with other elements;
c) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, Mn, V, or Cd, and their mixtures, composites, or lithium-containing composites;
d) lithiated and un-lithiated salts and hydroxides of Sn;
e) lithium titanate, lithium manganate, lithium aluminate, lithium-containing titanium oxide, lithium transition metal oxide;
f) lithiated and un-lithiated particles of natural graphite, artificial graphite, mesocarbon microbeads, hard carbon (commonly defined as the carbon materials that cannot be graphitized at a temperature higher than 2,500° C.), soft carbon (carbon materials that can be graphitized at a temperature higher than 2,500° C.), needle coke, polymeric carbon, carbon or graphite fiber segments, carbon nanofiber or graphitic nanofiber, carbon nanotube;
and combinations thereof.

The particles of an anode active material (e.g. Si, Ge, $SiO_x$, Sn, $SnO_2$, etc., wherein x=0.01–1.9) preferably have a diameter from 5 nm to 1 μm, more preferably from 10 to 500 nm, and most preferably from 20 to 100 nm.

The electrolyte used in the instant lithium battery may be selected from a non-aqueous liquid electrolyte, polymer gel electrolyte, polymer electrolyte, quasi-solid electrolyte, solid-state inorganic electrolyte, ionic liquid electrolyte, or a combination thereof.

In certain embodiments, the electrolyte comprises a lithium ion-conducting inorganic species or lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The electrolyte may comprise a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, an ionic liquid solvent, or a combination thereof.

The electrolyte is preferably a non-flammable electrolyte e.g. an electrolyte having a flash point higher than 150° C., preferably higher than 200° C., and most preferably no detectable flash point (flash point being too high to be detectable or the amount of organic vapor being too little to detect at a temperature as high as 200° C.).

The non-flammable electrolyte can be a room temperature ionic liquid. Alternatively, the non-flammable electrolyte contains a solid polymer electrolyte or an inorganic solid electrolyte.

In certain embodiments, a non-flammable quasi-solid electrolyte contains a lithium salt dissolved in a liquid solvent having a lithium salt concentration from 3.5 M to 14.0 M (more typically from 3.5 M to 10 M and further more typically from 5.0 M to 7.5 M) so that the electrolyte exhibits a vapor pressure less than 0.01 kPa when measured at 20° C., a vapor pressure less than 60% of the vapor pressure of the liquid solvent alone, a flash point at least 20 degrees Celsius. higher than a flash point of the liquid solvent alone, a flash point higher than 150° C., or no flash point.

In certain embodiments, a non-flammable quasi-solid electrolyte contains a lithium salt dissolved in a mixture of a liquid solvent and a liquid additive having a lithium salt concentration from 1.5 M to 5.0 M so that the electrolyte exhibits a vapor pressure less than 0.01 kPa when measured at 20° C., a vapor pressure less than 60% of the vapor pressure of the liquid solvent alone, a flash point at least 20 degrees Celsius. higher than a flash point of the liquid solvent alone, a flash point higher than 150° C., or no flash point. The liquid additive, different in composition than the liquid solvent, is selected from Hydrofluoro ether (HFE), Trifluoro propylene carbonate (FPC), Methyl nonafluorobutyl ether (MFE), Fluoroethylene carbonate (FEC), Tris (trimethylsilyl)phosphite (TTSPi), Triallyl phosphate (TAP), Ethylene sulfate (DTD), 1,3-propane sultone (PS), Propene sultone (PES), Diethyl carbonate (DEC), Alkylsiloxane (Si—O), Alkyylsilane (Si—C), liquid oligomeric silaxane (—Si—O—Si—), Ttetraethylene glycol dimethylether (TEGDME), canola oil, or a combination thereof. The liquid additive-to-liquid solvent ratio in the mixture is from 5/95 to 95/5 by weight, preferably from 15/85 to 85/15 by weight, further preferably from 25/75 to 75/25 by weight, and most preferably from 35/65 to 65/35 by weight.

There is no limitation on the type of cathode active materials that can be incorporated in the cathode. Any commonly used cathode active material for a lithium-ion battery or lithium metal battery can be used for practicing the present invention. The cathode active material may be selected from an inorganic material, an organic or polymeric material, a metal oxide, metal phosphate, metal sulfide, metal halide, metal selenide, or a combination thereof.

As some non-limiting examples, the metal oxide/phosphate/sulfide/selenide/halide may be selected from a lithium cobalt oxide, lithium nickel oxide, lithium manganese oxide, lithium vanadium oxide, lithium-mixed metal oxide (e.g. the well-known NCM and NCA), lithium iron phosphate, lithium manganese phosphate, lithium vanadium phosphate, lithium mixed metal phosphate, sodium cobalt oxide sodium nickel oxide, sodium manganese oxide, sodium vanadium oxide, sodium-mixed metal oxide, sodium iron phosphate, sodium manganese phosphate, sodium vanadium phosphate, sodium mixed metal phosphate, transition metal sulfide, lithium polysulfide, sodium polysulfide, lithium selenide, magnesium polysulfide, or a combination thereof.

In some embodiments, the cathode active material is selected from sulfur, sulfur compound, sulfur-carbon composite, sulfur-polymer composite, lithium polysulfide, transition metal dichalcogenide, a transition metal trichalcogenide, or a combination thereof. The inorganic material may be selected from $TiS_2$, $TaS_2$, $MoS_2$, $NbSe_3$, $MnO_2$, $CoO_2$, an iron oxide, a vanadium oxide, or a combination thereof.

In some embodiments, the metal oxide/phosphate/sulfide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$. In some embodiments, the metal oxide/phosphate/sulfide is selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

The inorganic material for use as a cathode active material may be selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

In some embodiments, the organic material or polymeric material is selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, Hexaazatrinaphtylene (HATN), Hexaazatriphenylene hexacarbonitrile ($HAT(CN)_6$), 5-Benzylidene hydantoin, Isatine lithium salt, Pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof. These compounds are preferably mixed with a conducting material to improve their electrical conductivity and rigidity so as to enable the peeling-off of graphene sheets from the graphitic material particles.

The thioether polymer in the above list may be selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In some embodiments, the organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof. These compounds are preferably mixed with a conducting material to improve their electrical conductivity and rigidity so as to enable the peeling-off of graphene sheets from the graphitic material particles.

The advantages and features of the present invention will become more transparent with the description of the following best mode practice and illustrative examples.

DETAILED DESCRIPTION OF PREFERRED EMBODIMENTS

Figure 1:
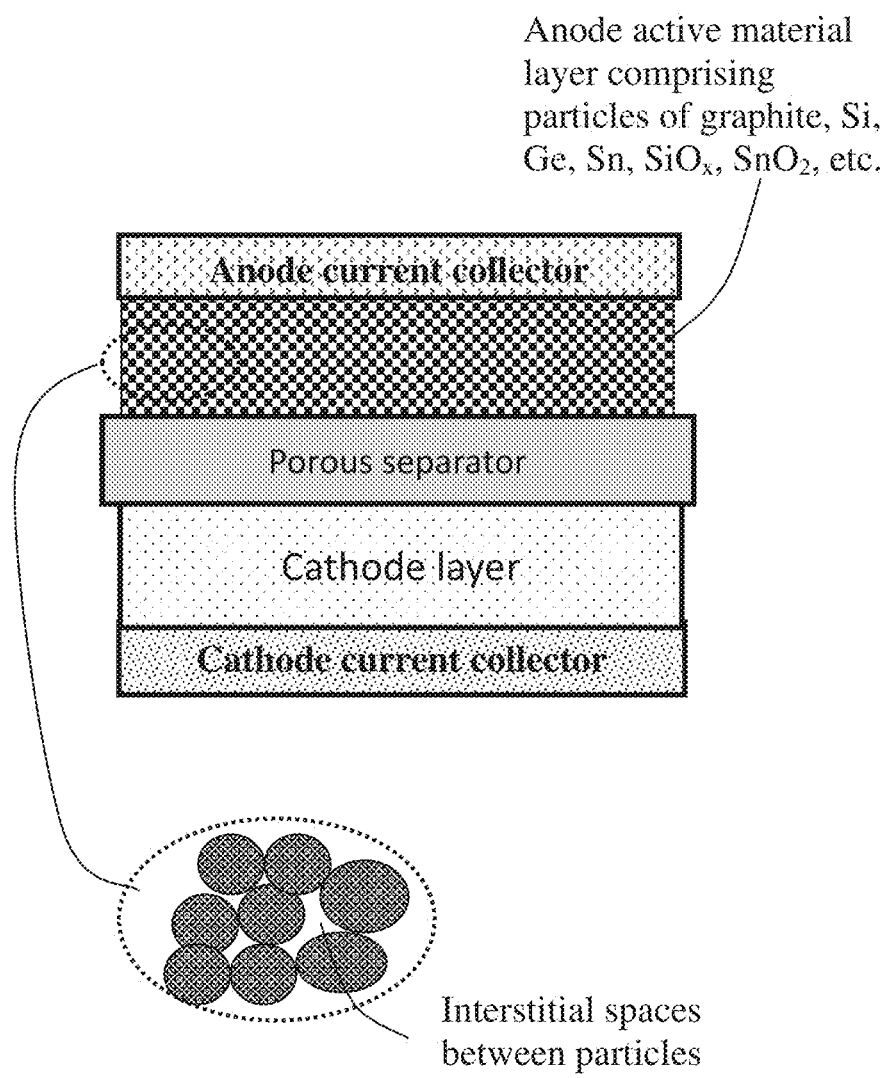
FIG. 1 Schematic of a lithium-ion battery containing an anode (comprising particles of an anode active material, such as Si and $SnO_2$, an optional conductive additive, and an optional resin binder) and lithium ion reservoirs (lithium ion-capturing fluid) residing in interstitial spaces between anode active material particles packed together.

The present invention provides a lithium secondary battery, as schematically illustrated in FIG. 1 for a lithium-ion battery (e.g. having an active material layer containing particles of an anode active material, such as graphite, Si, Ge, Sn, $SnO_2$, optional conductive additive and optional resin binder).

In some embodiments, the lithium secondary battery comprises an anode, a cathode, a porous or ion-permeable separator disposed between the anode and the cathode, and an electrolyte, wherein the anode comprises particles of an anode active material that are packed together to form an anode active material layer having interstitial spaces to accommodate a lithium ion reservoir (or lithium ion capturing fluid) disposed therein and configured to receive lithium ions from the cathode through the porous separator when the battery is charged and enable the lithium ions to enter the particles of anode active material in a time-delayed manner, wherein the lithium ion reservoir comprises lithium-capturing groups dispersed in a fluid residing in these interstitial spaces and the lithium-capturing groups are selected from (a) redox forming species that reversibly form a redox pair with a lithium ion when the battery is charged; (b) electron-donating groups interspaced between non-electron-donating groups; (c) anions and cations wherein the anions are more mobile than the cations; (d) chemical reducing groups that partially reduce lithium ions from $Li^{+1}$ to $Li^{+\delta}$, wherein $0<\delta<1$; (e) an ionic liquid; (f) borate salt or phosphate salt; or (g) a combination thereof. The electrolyte itself can be the porous or ion-permeable separator if the electrolyte contains a polymer electrolyte, a solid-state electrolyte, or a quasi-solid electrolyte.

There are interstitial spaces between particles of an anode active material (e.g. lower portion of FIG. 1). The conventional electrode typically has a volume fraction of interstitial spaces from approximately 15% to 30% due to the desire to increase the packing density or tap density of the electrode (hence, increased energy density per volume). Such a low fraction of interstitial spaces means a low volume of space to accommodate the lithium ion reservoir fluid (for the instant lithium-ion cell) or the liquid electrolyte (for a conventional lithium-ion cell). Instant invention has found an effective way to increase the volume fraction of interstitial spaces (e.g. 20%-75%, or preferably, 30%-50% by volume) that enables fast charging without compromising the energy density of a lithium-ion cell.

The term "in a time-delayed manner" means that (a) at least a portion (e.g. no less than 10%) of the lithium ions that enter the lithium ion reservoir does not immediately enter the anode active material particles (but being retained in the reservoir) when the battery is charged at a charging rate of 5C or higher; or (b) when the external battery charger is switched off or unplugged, at least a portion of the of the lithium ions that enter the lithium ion reservoir remains in the reservoir and continues to enter the anode active material particles (i.e. the internal charging procedure continues even though the external charger is off). The presently invented lithium ion reservoir strategy enables the charging process to be conducted in a time-delayed manner to allow most of the available lithium ions to eventually get charged into the anode active material. Without such a lithium ion reservoir, fast charging can lead to either a significantly lower amount of lithium ions that actually get intercalated or inserted into the anode active material or the formation of lithium metal plating and dangerous lithium dendrite formation.

In some embodiments, the lithium-capturing group is selected from a molecule having a core or backbone structure and at least a side group that is ionic or electron-rich in nature. The core or backbone structure may contain an aryl, heterocycloalkyl, crown etheryl, cyclamyl, cyclenyl, 1,4,7-Triazacyclononayl, hexacyclenyl, cryptandyl, naphtalenyl, antracenyl, phenantrenyl, tetracenyl, chrysenyl, tryphenyle-nyl, pyrenyl, pentacenyl, single-benzene or cyclic structure, double-benzene or bi-cyclic structure, or multiple-cyclic structure having 3-10 benzene rings. The side group may contain $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano, $CF_3$, or $Si(OR)_3$; wherein R is independently selected from methyl, ethyl, isopropyl, n-propyl, alkyl, haloalkyl, cycloalkyl, heterocycloalkyl, aryl, or benzyl; $M^1$ is selected from Li, Na, K, Rb, or Cs; $M^2$ is selected from Be, Mg, Ca, Sr, or Ba.

In some specific embodiments, the redox pair with lithium is selected from lithium 4-methylbenzenesulfonate, lithium 3,5-dicarboxybenzenesulfonate, lithium 2,6-dimethylbenzene-1,4-disulfonate, 3,3'-((1,2-dithiane-4,5-diyl)bis(oxy)) bis(N-hydroxypropanamide), 3,3'-((4-mercapto-1,2-phenylene)bis(oxy))bis(N-hydroxypropanamide), lithium aniline sulfonate, poly(lithium-4-styrenesulfonate, lithium sulfate, lithium phosphate, lithium phosphate monobasic, lithium trifluoromethanesulfonate, lithium 1,1,2,2,3,3,4,4,5,5,6,6,7,7,8,8,8-heptadecafluorooctane-1-sulfonate, lithium 2,6-di-tert-butylbenzene-1,4-disulfonate, lithium aniline sulfonate (wherein the sulfonate may be in any of para, meta and ortho positions), poly(lithium-4-styrenesulfonate, or a combination thereof.

Electron-donating groups may be selected from those molecules having one to 10 benzene rings or cyclic structure as the core/backbone portion having conjugated double bonds, acidic groups, etc. Examples include sodium 4-methylbenzenesulfonate, sodium 3,5-dicarboxybenzenesulfonate, sodium 2,6-dimethylbenzene-1,4-disulfonate, and sodium aniline sulfonate. These molecules in the lithium ion reservoir appear to be capable of partially reducing the incoming lithium ions that pass through the porous separator from the cathode.

The lithium ion-capturing group may contain a salt that is dissociated into an anion and a cation in a liquid medium (typically an organic solvent). Non-limiting examples of these salts are $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, or a combination thereof, wherein X=F, Cl, I, or Br, R=a hydrocarbon group, $0<x\leq 1$, $1\leq y\leq 4$. The liquid medium to dissolve these salts may contain a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, Hydrofluoro ether (HFE), Trifluoro propylene carbonate (FPC), Methyl nonafluorobutyl ether (MFE), Fluoroethylene carbonate (FEC), Tris(trimethylsilyl)phosphite (TTSPi), Triallyl phosphate (TAP), Ethylene sulfate (DTD), 1,3-propane sultone (PS), Propene sultone (PES), Diethyl carbonate (DEC), Alkylsiloxane (Si—O), Alkyylsilane (Si—C), liquid oligomeric silaxane (—Si—O—Si—), Ttetraethylene glycol dimethylether (TEGDME), an ionic liquid solvent, or a combination thereof.

The lithium ion-capturing groups may contain ionic liquids, which are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The desired ionic liquids for use in the presently invented lithium ion reservoir preferably have a melting point lower than 60° C., more preferably lower than 0° C., and further more preferably lower than −20° C. The IL salts are characterized by weak interactions, due to the combination of a large cation and a charge-delocalized anion. This results in a low tendency to crystallize due to flexibility (anion) and asymmetry (cation). The anions of the ionic liquid may be selected to be more mobile than the cations.

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

In some embodiments, prior to being incorporated into the anode active material layer, the particles of anode active material are coated with molecules selected from lithium 4-methylbenzenesulfonate, lithium 3,5-dicarboxybenzenesulfonate, lithium 2,6-dimethylbenzene-1,4-disulfonate, 3,3'-((1,2-dithiane-4,5-diyl)bis(oxy))bis(N-hydroxypropanamide), 3,3'-((4-mercapto-1,2-phenylene)bis(oxy)) bis(N-hydroxypropanamide), lithium aniline sulfonate, poly(lithium-4-styrenesulfonate, lithium sulfate, lithium phosphate, lithium phosphate monobasic, lithium trifluoromethane-sulfonate, lithium 1,1,2,2,3,3,4,4,5,5,6,6,7,7,8,8,8-heptadecafluorooctane-1-sulfonate, lithium 2,6-di-tert-butylbenzene-1,4-disulfonate, lithium aniline sulfonate (wherein the sulfonate may be in any of para, meta and ortho positions), poly(lithium-4-styrenesulfonate, or a combination thereof. These species appear to work well with an ionic liquid (by being able to attract either the positive or negative moiety of an ionic liquid) when the lithium ion reservoir contains an ionic liquid as a lithium ion-capturing group.

The borate salt or phosphate salt may be selected from lithium bis(oxalate)borate (LiBOB, $LiB(C_2O_4)_2$), lithium bis(malonato)borate (LiBMB), lithium trifluoro-methanesulfonimide (LiTFSI), lithium difluoro(oxalate)borate (LiFOB, $LiBF_2(C_2O_4)$), lithium tetraborate ($LiB_4O_7$), a borate oxide ($B_2O_3$)-forming species, lithium phosphate ($LiPO_4$), lithium pyrophosphate ($LiP_2O_7$), lithium triphosphate ($LiP_3O_{10}$), a phosphate oxide ($P_2O_5$)-forming species, or a combination thereof.

The present invention also provides a process for producing the aforementioned fast-chargeable lithium-ion battery. In some embodiments, the process comprises:

A) forming an anode active material layer by (i) mixing particles of an anode active material with an ionic liquid or with lithium-capturing groups dispersed in a liquid medium to form a lithium ion-capturing fluid; and (ii) shaping the lithium ion-capturing fluid into the anode active material layer in such a manner that this layer comprises the anode active material particles that are packed together to form interstitial spaces that accommodate the lithium ion fluid disposed therein as lithium ion reservoir; and B) combining the anode active material layer, an electrolyte (electrolyte A) with an optional separator, and a cathode to form a lithium-ion cell.

The liquid medium may contain a solvent or an electrolyte (electrolyte B) that is the same or, preferably, different in composition than the intended electrolyte (electrolyte A) of the battery cell. The ionic liquid itself can be a lithium ion-capturing species and, as a liquid, can by itself be the lithium ion reservoir when confined in the interstitial spaces.

In some embodiments, the interstitial spaces occupy a volume fraction of the anode active material layer from 20% to 75%, preferably from 30% to 50%. Preferably, the sizes of the anode active material particles are from 5 nm to 100 nm and step (a) in the process comprises exerting a compression stress to consolidate the anode active material layer (e.g. using roll-pressing) to the extent that the interconnecting channels between the interstitial spaces are smaller than 20 nm in size (preferably smaller than 10 nm) so that the lithium ion capturing groups lodged therein cannot readily diffuse out; enabling the battery to maintain the fast-charging capability for an extended period of time.

It may be noted that the conventional process for producing lithium-ion batteries typically involves mixing and dispersing the anode active material particles (e.g. graphite or Si particles), a conductive additive (e.g. carbon black), and a resin binder (e.g. SBR, PVDF, etc.) in a liquid medium (e.g. water or NMP) to form a slurry, coating the slurry onto a current collector (Cu foil), drying the slurry, and roll-pressing the dried mixture on Cu foil to make an anode electrode. A cathode electrode is also made in a similar manner. An anode, a separator, and a cathode layer are then packaged together to form a dry cell, which is subsequently injected with a liquid electrolyte. Since the electrodes (both the anode and the cathode) have been heavily compressed, with particles of the anode active material being closely packed together, such electrodes, having limited proportion of interstitial spaces and excessively small interconnecting channels between such spaces, are not conducive to easy entry by either the liquid electrolyte itself or the presently invented lithium ion-capturing fluid. This results in a limited amount of lithium ion-capturing groups being able to enter the interstitial spaces, which are already limited in amounts.

The conventional electrode typically has a volume fraction of interstitial spaces from approximately 15% to 30%. With a limited amount of lithium ion-capturing groups (approximately 1%-10% of the space) being able to enter the available interstitial spaces, the lithium ion capturing groups can only occupy from 0.015% to 3% by volume of the anode active material layer prepared according to the conventional slurry coating and drying procedure. In contrast, the presently invented process enables the accommodation of from 5% to 60% by volume (more typically 10%-40%) of the lithium ion capturing groups into the anode active material layer. Such a high proportion of the lithium ion reservoir enables fast charging of a great amount of lithium ions into the anode when the battery is recharged.

In some preferred embodiments, the sub-step (ii) of shaping the lithium ion-capturing fluid comprises impregnating or infiltrating this fluid into pores of an electronically conductive porous layer. The electrically conductive porous layer may be selected from metal foam, metal web or screen, perforated metal sheet-based structure, metal fiber mat, metal nanowire mat, conductive polymer nanofiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or a combination thereof. This conductive porous layer is substantially of the same size as the anode active material layer. This conductive porous layer may be used as the only current collector in the anode or may be used in addition to a conventional current collector (e.g. Cu foil).

Figure 2A:
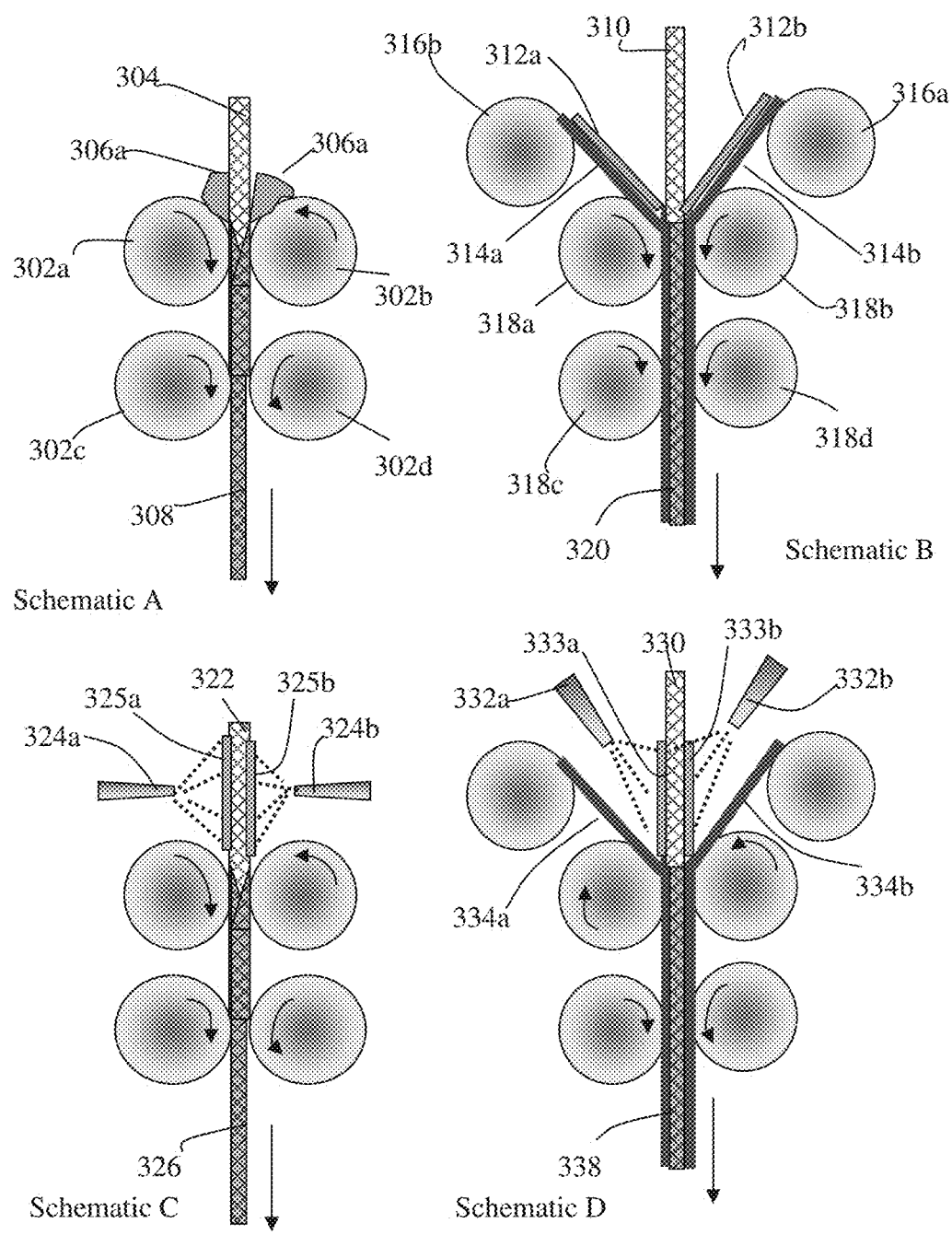
FIG. 2(A) Four examples that schematically illustrate the presently invented process for producing an electrode (e.g. anode) of a lithium-ion battery.
Figure 2B:
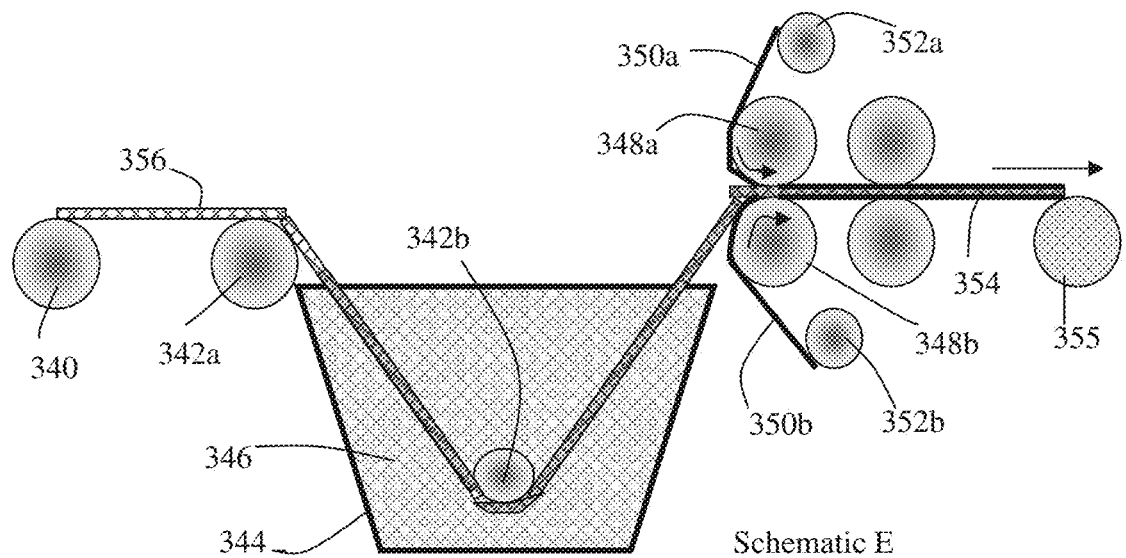
FIG. 2(B) Another example to schematically illustrate the presently invented process to produce an electrode (anode or cathode).

The procedure of impregnating or infiltrating the lithium ion-capturing fluid into pores of an electronically conductive porous layer may be accomplished in several different ways. For instance, in some embodiment of the present invention, as illustrated in FIG. 2(A) and FIG. 2(B), the procedure comprises continuously feeding an electrically conductive porous layer (e.g. 304, 310, 322, or 330), from a feeder roller (not shown), into an active material/lithium ion-capturing fluid mixture impregnation zone where a lithium ion-capturing fluid (e.g. a suspension or gel-like mass, such as 306a, 306b, 312a, 312b), including particles of an anode active material and an optional conductive additive, is delivered to at least a porous surface of the porous layer (e.g. 304 or 310 in Schematic A and schematic B, respectively, of FIG. 2(A)). Using Schematic A as an example, the active material/lithium ion-capturing fluid mixture (306a, 306b) is forced to impregnate into the porous layer from both sides using one or two pairs of rollers (302a, 302b, 302c, and 302d) to form an impregnated active electrode layer 308 (e.g. an anode). The conductive porous layer contains interconnected conductive pathways and at least 70% by volume (preferably from 80% to 99%) of pores.

In Schematic B, two feeder rollers 316a, 316b are used to continuously pay out two protective films 314a, 314b that support wet lithium ion-capturing fluid mixture layers 312a, 312b. These wet mixture layers 312a, 312b can be delivered to the protective (supporting) films 314a, 314b using a broad array of procedures (e.g. printing, spraying, casting, coating, etc., which are well known in the art). As the conductive porous layer 110 moves though the gaps between two sets of rollers (318a, 318b, 318c, 318d), the wet lithium ion-capturing fluid is impregnated into the pores of the porous layer 310 to form an active material electrode 320 covered by two protective films 314a, 314b.

Using Schematic C as another example, two spraying devices 324a, 324b were used to dispense the wet active material/lithium ion-capturing fluid mixture (325a, 325b) to the two opposed porous surfaces of the conductive porous layer 322. The wet active material/lithium ion-capturing fluid mixture is forced to impregnate into the porous layer from both sides using one or two pairs of rollers to form an impregnated active electrode 326. Similarly, in Schematic D, two spraying devices 332a, 332b were used to dispense the wet active material/lithium ion-capturing fluid mixture (333a, 333b) to the two opposed porous surfaces of the conductive porous layer 330. The wet active material/lithium ion-capturing fluid mixture is forced to impregnate into the porous layer from both sides using one or two pairs of rollers to form an impregnated active electrode 338.

The resulting active anode layer, after consolidation, has a thickness typically no less than 100 µm (preferably >200 µm, further preferably >300 µm, more preferably >400 µm; further more preferably >500 µm, 600 µm, or even >1,000 µm; no theoretical limitation on this anode thickness. Consolidation is accomplished with the application of a compressive stress (from rollers) to force the wet active material/lithium ion-capturing fluid mixture ingredients to infiltrate into the pores of the conductive porous layer. The conductive porous layer is also compressed together to form a current collector that essentially extends over the thickness of the entire electrode.

Another example, as illustrated in Schematic E of FIG. 2(B), the electrode production process begins by continuously feeding a conductive porous layer 356 from a feeder roller 340. The porous layer 356 is directed by a roller 342 to get immersed into a wet active material/lithium ion-capturing fluid mixture mass 346 (suspension, gel, etc.) in a container 344. The active material/lithium ion-capturing fluid mixture begins to impregnate into pores of the porous layer 356 as it travels toward roller 342b and emerges from the container to feed into the gap between two rollers 348a, 348b. Two protective films 350a, 350b are concurrently fed from two respective rollers 352a, 352b to cover the impregnated porous layer 354, which may be continuously collected on a rotating drum (a winding roller 355). The process is applicable to both the anode and the cathode electrodes.

Figure 2C:
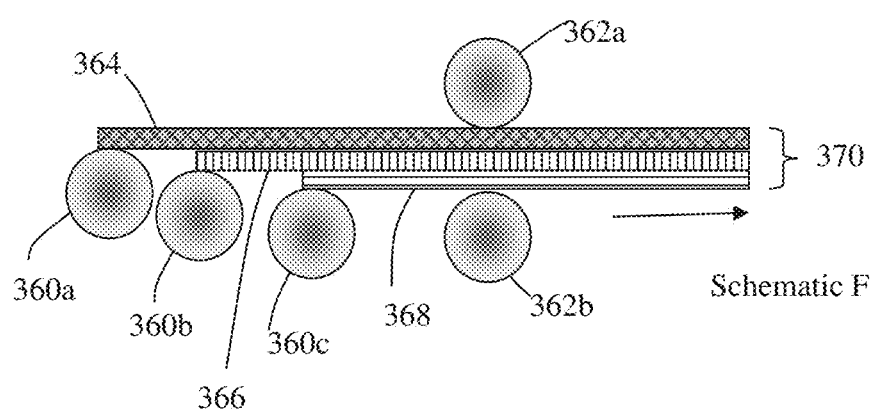
FIG. 2(C) Schematic of a presently invented process for continuously producing a lithium-ion battery by combining and laminating an anode electrode, separator, and cathode electrode (illustrated in Schematic F).

As illustrated in Schematic F of FIG. 2(C), at least one anode electrode 364 (e.g. produced by the presently invented process), a porous separator 366, and at least one cathode electrode 368 may be unwound from rollers 360a, 360b, and 360c, respectively, laminated and consolidated together by moving through a pair of rollers 362a, 362b to form a lithium-ion battery assembly 370. Such a battery assembly 370 can be slit and cut into any desired shape and dimensions and sealed in a protective housing. It may be noted that a plurality of impregnated anode layers can be stacked and compacted into one single anode electrode. Similarly, a plurality of impregnated cathode layers can be stacked and compacted into one single cathode electrode.

The above are but a few examples to illustrate how the presently invented lithium-ion battery electrode (e.g. anode) can be made continuously, in an automated manner. These examples should not be used to limit the scope of the instant invention.

In certain embodiments, lithium-capturing groups are selected from (a) redox forming species that reversibly form a redox pair with a lithium ion when the battery is charged; (b) electron-donating groups interspaced between non-electron-donating groups; (c) anions and cations wherein the anions are more mobile than the cations; (d) chemical reducing groups that partially reduce lithium ions from $Li^{+1}$ to $Li^{+\delta}$, wherein $0<\delta<1$; (e) an ionic liquid; (f) borate salt or phosphate salt; or (g) a combination thereof In some embodiments, the electron-conducting porous structure has pore walls comprising an electron-conducting material selected from carbon nanotubes, carbon nanofibers, graphene sheets, expanded graphite platelets, carbon fibers, graphite fibers, graphite particles, needle coke, mesocarbon microbeads, carbon particles, carbon black, acetylene black, activated carbon particles, or a combination thereof. In some embodiments, the electron-conducting material is made into a fabric (woven or non-woven), paper, or foam structure. The foam structure may be a closed-cell foam, but preferably an open-cell foam. The construction or production of these electron-conducting materials in a fabric, paper, or foam structure is well-known in the art.

Preferably, the electron-conducting porous structure contains a graphene foam. Generally speaking, a foam (or foamed material) is composed of pores (or cells) and pore walls (the solid portion of a foam material). The pores can be interconnected to form an open-cell foam. A graphene foam is composed of pores and pore walls that contain a graphene material. There are several major methods of producing graphene foams:

The first method is the hydrothermal reduction of graphene oxide hydrogel that typically involves sealing graphene oxide (GO) aqueous suspension in a high-pressure autoclave and heating the GO suspension under a high pressure (tens or hundreds of atm) at a temperature typically in the range from 180-300° C. for an extended period of time (typically 12-36 hours). A useful reference for this method is given here: Y. Xu, et al. "Self-Assembled Graphene Hydrogel via a One-Step Hydrothermal Process," ACS Nano 2010, 4, 4324-4330.

The second method is based on a template-assisted catalytic CVD process, which involves CVD deposition of graphene on a sacrificial template (e.g. Ni foam). The graphene material conforms to the shape and dimensions of the Ni foam structure. The Ni foam is then etched away using an etching agent, leaving behind a monolith of graphene skeleton that is essentially an open-cell foam. A useful reference for this method is given here: Zongping Chen, et al., "Three-dimensional flexible and conductive interconnected graphene networks grown by chemical vapour deposition," Nature Materials, 10 (June 2011) 424-428. There are several problems associated with such a process: (a) the catalytic CVD is intrinsically a very slow, highly energy-intensive, and expensive process; (b) the etching agent is typically a highly undesirable chemical and the resulting Ni-containing etching solution is a source of pollution. It is very difficult and expensive to recover or recycle the dissolved Ni metal from the etchant solution. (c) It is challenging to maintain the shape and dimensions of the graphene foam without damaging the cell walls when the Ni foam is being etched away. The resulting graphene foam is typically very brittle and fragile.

The third method of producing graphene foam also makes use of a sacrificial material (e.g. colloidal polystyrene particles, PS) that is coated with graphene oxide sheets using a self-assembly approach. For instance, Choi, et al. prepared chemically modified graphene (CMG) paper in two steps: fabrication of free-standing PS/CMG films by vacuum filtration of a mixed aqueous colloidal suspension of CMG and PS (2.0 μm PS spheres), followed by removal of PS beads to generate 3D macro-pores. [B. G. Choi, et al., "3D Macroporous Graphene Frameworks for Supercapacitors with High Energy and Power Densities," ACS Nano, 6 (2012) 4020-4028.] Choi, et al. fabricated well-ordered free-standing PS/CMG paper by filtration, which began with separately preparing a negatively charged CMG colloidal and a positively charged PS suspension. A mixture of CMG colloidal and PS suspension was dispersed in solution under controlled pH (=2), where the two compounds had the same surface charges (zeta potential values of +13±2.4 mV for CMG and +68±5.6 mV for PS). When the pH was raised to 6, CMGs (zeta potential=−29±3.7 mV) and PS spheres (zeta potential=+51±2.5 mV) were assembled due to the electrostatic interactions and hydrophobic characteristics between them, and these were subsequently integrated into PS/CMG composite paper through a filtering process.

The fourth method of producing a graphene foam (Aruna Zhamu and Bor Z. Jang, "Highly Conductive Graphene Foams and Process for Producing Same," U.S. patent application Ser. No. 14/120,959 (Jul. 17, 2014); US Publication No.20160019995 (Jan. 21, 2016)) comprises:

(a) preparing a graphene dispersion having particles of an anode active material and a graphene material dispersed in a liquid medium, wherein the graphene material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof and wherein the dispersion contains an optional blowing agent;

(b) dispensing and depositing the graphene dispersion onto a surface of a supporting substrate (e.g. plastic film, rubber sheet, metal foil, glass sheet, paper sheet, etc.) to form a wet layer of graphene-anode material mixture, wherein the dispensing and depositing procedure includes subjecting the graphene dispersion to an orientation-inducing stress;

(c) partially or completely removing the liquid medium from the wet layer of graphene-anode material mixture to form a dried layer of material mixture having a content of non-carbon elements (e.g. O, H, N, B, F, Cl, Br, I, etc.) no less than 5% by weight; and (d) heat treating the dried layer of material mixture at a first heat treatment temperature from 100° C. to 3,200° C. at a desired heating rate sufficient to induce volatile gas molecules from the non-carbon elements or to activate the blowing agent for producing the anode layer.

The solid graphene foam in the anode layer typically has a density from 0.01 to 1.7 $g/cm^3$ (more typically from 0.1 to 1.5 $g/cm^3$, and even more typically from 0.1 to 1.0 $g/cm^3$, and most typically from 0.2 to 0.75 $g/cm^3$), or a specific surface area from 50 to 3,000 $m^2/g$ (more typically from 200 to 2,000 $m^2/g$, and most typically from 500 to 1,500 $m^2/g$).

This optional blowing agent is not required if the graphene material has a content of non-carbon elements (e.g. O, H, N, B, F, Cl, Br, I, etc.) no less than 5% by weight (preferably no less than 10%, further preferably no less than 20%, even more preferably no less than 30% or 40%, and most preferably up to 50%). The subsequent high temperature treatment serves to remove a majority of these non-carbon elements from the graphene material, generating volatile gas species that produce pores or cells in the solid graphene material structure. In other words, quite surprisingly, these non-carbon elements play the role of a blowing agent. Hence, an externally added blowing agent is optional (not required). However, the use of a blowing agent can provide added flexibility in regulating or adjusting the porosity level and pore sizes for a desired application. The blowing agent is typically required if the non-carbon element content is less than 5%, such as pristine graphene that is essentially all-carbon.

In the lithium-ion battery, the anode (sometimes referred to as anode electrode) typically is composed of an anode active material, a conductive additive (e.g. carbon black, acetylene black, graphite platelets, carbon nanotubes, etc.), and a resin binder (e.g. the well-known SBR rubber, PVDF, CMC, etc.). When an electrically conductive porous layer is used, the binder resin is not required. In some embodiments, the anode electrode may comprise an anode active material comprising an element selected from Si, Ge, Sn, Cd, Sb, Pb, Bi, Zn, Al, Co, Ni, Ti, or an alloy thereof.

In some embodiments, the anode comprises an anode active material selected from the group consisting of: (A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (B) lithiated and un-lithiated alloys or intermetallic compounds of Si, Ge, Sn, Pb, Sb, Bi, Zn, Al, Ti, Ni, Co, or Cd with other elements; (C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, Mn, V, or Cd, and their mixtures, composites, or lithium-containing composites; (D) lithiated and un-lithiated salts and hydroxides of Sn; (E) lithium titanate, lithium manganate, lithium aluminate, lithium-containing titanium oxide, lithium transition metal oxide; (F) lithiated and un-lithiated particles of natural graphite, artificial graphite, mesocarbon microbeads, hard carbon (commonly defined as the carbon materials that cannot be graphitized at a temperature higher than 2,500° C.), soft carbon (carbon materials that can be graphitized at a temperature higher than 2,500° C.), needle coke, polymeric carbon, carbon or graphite fiber segments, carbon nanofiber or graphitic nanofiber, carbon nanotube; and combinations thereof.

The anode of a lithium-ion battery may be made by using the well-known slurry coating method. For instance, one may mix particles of an anode active material (e.g. carbon-coated Si nanoparticles or nanowires), a resin binder (e.g. SBR rubber, CMC, polyacrylamide), and a conductive filler (e.g. particles of acetylene black, carbon black, or carbon nanotubes) in water or an organic solvent (e.g. NMP) to form a slurry. The slurry is then coated on one primary surface or both primary surfaces of a Cu foil and then dried to form an anode electrode. For the anode of a lithium metal battery, one may simply use a thin Li foil attached to a Cu foil or a graphene-based current collector.

The particles of an anode active material (e.g. Si, Ge, $SiO_x$, Sn, $SnO_2$, etc., wherein x=0.01–1.9) preferably have a diameter from 5 nm to 1 μm, more preferably from 10 to 500 nm, and most preferably from 20 to 100 nm.

There is no restriction on the type of porous separator that can be used in the presently invented lithium battery. A porous separator (e.g. polyolefin-based, non-woven of electrically insulating fibers, etc.) may be used in lithium secondary batteries for the purpose of preventing short circuiting between an anode and a cathode, but having pores serving as a passage for lithium ions. Most of the commercially available lithium batteries make use of a polyolefin (e.g. polyethylene, polypropylene, PE/PP copolymer, etc.) as a separator.

There is essentially no restriction on the type of cathode active materials for use in the presently invented protected lithium cells. The cathode active material in the cathode in this rechargeable alkali metal battery may be selected from sulfur, selenium, tellurium, lithium sulfide, lithium selenide, lithium telluride, sodium sulfide, sodium selenide, sodium telluride, a chemically treated carbon or graphite material having an expanded inter-graphene spacing $d_{002}$ of at least 0.4 nm, or an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, nickel, or a combination thereof. Preferred cathode active materials include non-lithiated and slightly lithiated compounds having relatively high lithium or sodium storage capacities, such as $TiS_2$, $MoS_2$, $MnO_2$, $CoO_2$, and $V_2O_5$.

A novel family of 2D metal carbides or metal carbonides, now commonly referred to as MXenes, can be used as a cathode active material. MXenes can be produced by partially etching out certain elements from layered structures of metal carbides such as $Ti_3AlC_2$. For instance, an aqueous 1 M $NH_4HF_2$ was used at room temperature as the etchant for $Ti_3AlC_2$. Typically, MXene surfaces are terminated by O, OH, and/or F groups, which is why they are usually referred to as $M_{n+1}X_nT_x$, where M is an early transition metal, X is C and/or N, T represents terminating groups (O, OH, and/or F), n=1, 2, or 3, and x is the number of terminating groups. The MXene materials investigated include $Ti_2CT_x$, $(Ti_{0.5}, Nb_{0.5})_2CT_x$, $Nb_2CT_x$, $V_2CT_x$, $Ti_3C_2T_x$, $(V_{0.5}, Cr_{0.5})_3C_2T_x$, $Ti_3CNT_x$, $Ta_4C_3T_x$, and $Nb_4C_3T_x$.

In an embodiment, the cathode layer contains an air cathode and the battery is a lithium-air battery. In another embodiment, the cathode active material is selected from sulfur or lithium polysulfide and the battery is a lithium-sulfur battery. In yet another embodiment, the cathode active material may be selected from an organic or polymeric material capable of capturing or storing lithium ions (e.g. via reversibly forming a redox pair with lithium ion).

In the cathode electrode of a lithium-ion battery, the cathode active material may be selected from a metal oxide/phosphate/sulfide/halogenide, an inorganic material, an organic or polymeric material, or a combination thereof:

a) the group of metal oxide, metal phosphate, and metal sulfides consisting of lithium cobalt oxide, lithium nickel oxide, lithium manganese oxide, lithium vanadium oxide, lithium transition metal oxide, lithium-mixed metal oxide (e.g. the well-known NCM, NCA, etc.), transition metal fluoride, transition metal chloride, lithium iron phosphate, lithium manganese phosphate, lithium vanadium phosphate, lithium mixed metal phosphates, transition metal sulfides, and combinations thereof.
  a. In particular, the lithium vanadium oxide may be selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein 0.1<x<5;
  b. Lithium transition metal oxide may be selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

b) an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) sulfur, sulfur compound, lithium polysulfide (f) a combination thereof. In particular, $TiS_2$, $TaS_2$, $MoS_2$, $NbSe_3$, non-lithiated $MnO_2$, $CoO_2$, iron oxide, vanadium oxide, or a combination thereof may be used as a cathode active material in a lithium metal cell.

c) The organic material or polymeric material may be selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([$(NPS_2)_3$] n), lithiated 1,4,5,8-naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, Li$_4$C$_6$O$_6$, Li$_2$C$_6$O$_6$, Li$_6$C$_6$O$_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

The organic material may include a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The cathode of a lithium-ion battery may be made by using the well-known slurry coating method. For instance, one may mix particles of a cathode active material (e.g. particles of NMC, NCA, LiCoO$_2$, TiS$_2$, graphene-protected S particles, etc.), a resin binder (e.g. PVDF), and a conductive filler (e.g. particles of acetylene black, carbon black, or carbon nanotubes) in an organic solvent (e.g. NMP) to form a slurry. The slurry is then coated on one primary surface or both primary surfaces of an Al foil and then dried to form a cathode electrode.

The electrolytes that can be used in the lithium battery may be selected from any lithium metal salt that is dissolvable in a solvent to produce an electrolyte. Preferably, the metal salt is selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphate (LiPF$_3$(CF$_2$CF$_3$)$_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The electrolytes used may contain a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof. The ionic liquid may also be used as an electrolyte for the lithium battery.

The porous separator used in the instant lithium-ion cell can contain a film, woven fabric, or non-woven fabric formed using one or more selected from the group consisting of high-density polyethylene, low-density polyethylene, linear low-density polyethylene, ultrahigh-molecular weight polyethylene, polypropylene, polyethylene terephthalate, polybutylene terephthalate, polyester, polyacetal, polyamide, polycarbonate, polyimide, poly ether ether ketone, polyether sulfone, polyphenylene oxide, polyphenylene sulfide, polyethylene naphthalene, co-polymers thereof, blends thereof, and combinations thereof.

The anode of a lithium-ion battery may contain anode active material particles selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, ZnCo$_2$O$_4$; (f) particles of graphite and carbon; and (g) combinations thereof.

At the anode side, the anode active material of a lithium metal battery may contain a layer of Li metal or alloy (>70% by weight of Li, preferably >80%, and more preferably >90%). Alternatively, the Li metal or alloy may be supported by a nanostructure composed of conductive nanofilaments. For instance, multiple conductive nanofilaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting paths. The integrated structure has substantially interconnected pores to accommodate electrolyte. The nanofilament may be selected from, as examples, a carbon nanofiber (CNF), graphite nanofiber (GNF), carbon nanotube (CNT), metal nanowire (MNW), conductive nanofibers obtained by electrospinning, conductive electrospun composite nanofibers, nanoscaled graphene platelet (NGP), or a combination thereof. The nanofilaments may be bonded by a binder material selected from a polymer, coal tar pitch, petroleum pitch, mesophase pitch, coke, or a derivative thereof.

Nanofibers may be selected from the group consisting of an electrically conductive electrospun polymer fiber, electrospun polymer nanocomposite fiber comprising a conductive filler, nanocarbon fiber obtained from carbonization of an electrospun polymer fiber, electrospun pitch fiber, and combinations thereof. For instance, a nanostructured electrode can be obtained by electrospinning of polyacrylonitrile (PAN) into polymer nanofibers, followed by carbonization of PAN. It may be noted that some of the pores in the structure, as carbonized, are greater than 100 nm and some smaller than 100 nm.

In summary, as an embodiment, the invented lithium cell may be comprised of an anode active material particle layer (e.g. containing particles of Si plus conductive additive and optional binder resin, preferably residing in pores of a conductive porous layer), lithium ion reservoir residing in interstitial spaces in the anode active material layer, an anode current collector (e.g. Cu foil and/or a nanostructure of interconnected conductive filaments) supporting the anode layer a porous separator and an electrolyte phase, a cathode, and an optional cathode current collector (e.g. Al foil and/or or a nanostructure of interconnected conductive filaments, such as graphene sheets and carbon nanofibers) to support the cathode layer. These layers may be laminated together to form a battery cell, followed by injection of a liquid electrolyte (if electrolyte is not yet incorporated in the laminate).

The following examples serve to illustrate the preferred embodiments of the present invention and should not be construed as limiting the scope of the invention:

EXAMPLE 1

Illustrative Examples of Porous Conductive Layers (Foamed Current Collectors)

Various types of metal foams and fine metal webs/screens are commercially available for use as an anode or cathode foam structure (current collector); e.g. Ni foam, Cu foam, Al foam, Ti foam, Ni mesh/web, stainless steel fiber mesh, etc. Metal-coated polymer foams and carbon foams are also used as current collectors to accommodate anode active material/lithium ion-capturing fluid mixture.

Anode active material particles (nano Si and $SnO_2$ particles) were respectively mixed with several different lithium ion-capturing species to form a mixture fluid. The lithium ion-capturing species include lithium 4-methylbenzene-sulfonate, lithium aniline sulfonate, lithium sulfate, lithium phosphate, and an ionic liquid having a 1-ethyl-3-methyl-imidazolium (EMI) cation and an N,N-bis(trifluoromethane) sulphonamide (TFSI) anion. The mixture fluid was then impregnated into the pores of several foam structures.

The resulting anode active material layer, containing lithium ion-capturing reservoir residing in interstitial spaces between particles, were then implemented in several lithium cells, including lithium-ion cells ("$SnO_2$ anode+NCA cathode" and "anode of graphene-protected Si particles+NCM cathode").

We have observed that, by implementing a lithium ion reservoir in interstitial spaces between particles of the anode material, one enables the resulting lithium-ion batteries to be fast-charged at a rate of 10C to 30C with only a 10%-20% capacity reduction as compared to the battery measured at a rate of 0.5C. There was no observable lithium metal plated on surfaces of anode active material particles based on post-test SEM examination. In contrast, when recharged at a high C rate (e.g. 10C), the capacity of the conventional battery is less than 40% of the original capacity measured at 0.5C rate.

EXAMPLE 2

Ni Foam and CVD Graphene Foam-Based Conductive Porous Layers on Ni Foam Templates The procedure for producing CVD graphene foam was adapted from that disclosed in open literature: Chen, Z. et al. "Three-dimensional flexible and conductive interconnected graphene networks grown by chemical vapor deposition," Nature Materials, 10, 424-428 (2011). Nickel foam, a porous structure with an interconnected 3D scaffold of nickel was chosen as a template for the growth of graphene foam. Briefly, carbon was introduced into a nickel foam by decomposing $CH_4$ at 1,000° C. under ambient pressure, and graphene films were then deposited on the surface of the nickel foam. Due to the difference in the thermal expansion coefficients between nickel and graphene, ripples and wrinkles were formed on the graphene films. Four types of foams made in this example were used as a current collector in the presently invented lithium batteries: Ni foam, CVD graphene-coated Ni form, CVD graphene foam (Ni being etched away), and conductive polymer bonded CVD graphene foam.

In order to recover (separate) graphene foam from the supporting Ni foam, Ni frame was etched away. In the procedure proposed by Chen, et al., before etching away the nickel skeleton by a hot HCl (or $FeCl_3$) solution, a thin layer of poly (methyl methacrylate) (PMMA) was deposited on the surface of the graphene films as a support to prevent the graphene network from collapsing during nickel etching. After the PMMA layer was carefully removed by hot acetone, a fragile graphene foam sample was obtained. The use of the PMMA support layer was considered critical to preparing a free-standing film of graphene foam. Instead, we used a conducting polymer as a binder resin to hold graphene together while Ni was etched away. It may be noted that the CVD graphene foam used herein is intended as a foamed current collector to accommodate a suspension of active material particles and lithium ion-capturing fluid residing in pores of the foam. Multiple active material particles in a pore form interstitial spaces to accommodate lithium ion-capturing groups.

EXAMPLE 3

Graphitic Foam-Based Conductive Porous Layers from Pitch-Based Carbon Foams

Pitch powder, granules, or pellets are placed in a aluminum mold with the desired final shape of the foam. Mitsubishi ARA-24 mesophase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C./min. The temperature was held for at least 15 minutes to achieve a soak and then the furnace power was turned off and cooled to room temperature at a rate of approximately 1.5 degree C./min with release of pressure at a rate of approximately 2 psi/min. Final foam temperatures were 630° C. and 800° C. During the cooling cycle, pressure is released gradually to atmospheric conditions. The foam was then heat treated to 1050° C. (carbonized) under a nitrogen blanket and then heat treated in separate runs in a graphite crucible to 2500° C. and 2800° C. (graphitized) in Argon.

Anode active material particles (nano Si and $SnO_2$ particles) were respectively mixed with several different lithium ion-capturing species to form a mixture fluid. The lithium ion capturing groups used in this study were lithium aniline sulfonate and poly(lithium-4-styrenesulfonate. The mixture fluid was then impregnated into the pores of several foam structures.

EXAMPLE 4

Preparation of Graphene Oxide Sheets (GO) and Reduced Graphene Oxide (RGO) Foam

Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) or graphite oxide fiber was re-dispersed in water and/or alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. The resulting suspension contains GO sheets being suspended in water. A chemical blowing agent (hydrazo dicarbonamide) was added to the suspension just prior to casting.

The resulting suspension was then cast onto a stainless steel plate. A wiper was used to exert shear stresses at a high shearing rate, inducing GO sheet orientations. The wet GO suspension was then dried. For making a graphene foam specimen, the GO suspension was then subjected to heat treatments that typically involve an initial thermal reduction temperature of 80-350° C. for 1-8 hours, followed by heat-treating at a second temperature of 1,500-2,850° C. for 0.5 to 5 hours. We have found it essential to apply a compressive stress to the sample while being subjected to the first heat treatment. This compress stress seems to have helped maintain good contacts between the graphene sheets so that chemical merging and linking between graphene sheets can occur while pores are being formed. Without such a compressive stress, the heat-treated sample was typically excessively porous with constituent graphene sheets in the pore walls being very poorly oriented and incapable of chemical merging and linking with one another. As a result, the thermal conductivity, electrical conductivity, and mechanical strength of the graphene foam were compromised.

The resulting graphene foam structures were then separately dipped in several lithium ion-capturing species in a liquid state, including sodium 4-methylbenzenesulfonate, sodium aniline sulfonate, sodium sulfate, sodium phosphate, and an ionic liquid having a tetra-alkylimidazolium cation and a $BF_4^-$ anion, to prepare various lithium ion reservoir layers.

EXAMPLE 5

Preparation of Pristine Graphene Foam (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a graphene foam having a higher thermal conductivity. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements.

Various amounts (1%-30% by weight relative to graphene material) of chemical bowing agents (N,N-Dinitroso pentamethylene tetramine or 4,4'-Oxybis (benzenesulfonyl hydrazide) were added to a suspension containing pristine graphene sheets and a surfactant. The suspension was then cast onto a glass surface using a doctor's blade to exert shear stresses, inducing graphene sheet orientations. Several samples were cast, including one that was made using $CO_2$ as a physical blowing agent introduced into the suspension just prior to casting). The resulting graphene suspension shapes, after removal of liquid, have a thickness that can be varied from approximately 0.1 mm to 50 mm.

The graphene shapes were then subjected to heat treatments that involve an initial (first) thermal reduction temperature of 80-1,500° C. for 1-5 hours. This first heat treatment generated a graphene foam structure. Some of the pristine foam samples were then subjected to a second temperature of 1,500-2,850° C. to further perfect the graphene foam structure (re-graphitized to become more ordered or having a higher degree of crystallinity). These foam structures were used as a framework porous structure for accommodating a mixture of anode active material particles and lithium ion-capturing species.

EXAMPLE 6

Preparation of Graphene-Enabled $Li_xV_3O_8$ Nanosheets as a Cathode for a Li-Ion Cell All chemicals used in this study were analytical grade and were used as received without further purification. $V_2O_5$ (99.6%, Alfa Aesar) and LiOH (99+%, Sigma-Aldrich) were used to prepare the precursor solution. Graphene oxide (GO, 1% w/v obtained from Taiwan Graphene Co., Taipei, Taiwan) was used as a structure modifier. First, $V_2O_5$ and LiOH in a stoichiometric V/Li ratio of 1:3 were dissolved in actively stirred de-ionized water at 50° C. until an aqueous solution of $Li_xV_3O_8$ was formed. Then, GO suspension was added while stirring, and the resulting suspension was atomized and dried in an oven at 160° C. to produce the spherical composite particulates of GO/Li$_x$V$_3$O$_8$ nanosheets and the sample was designated NLVO-1. Corresponding Li$_x$V$_3$O$_8$ materials were obtained under comparable processing conditions, but without graphene oxide sheets. The sample was designated as LVO-2.

The Nyquist plots obtained from electrical impedance tests show a semicircle in the high to medium frequency range, which describes the charge-transfer resistance for both electrodes. The intercept value is considered to represent the total electrical resistance offered by the electrolyte. The inclined line represents the Warburg impedance at low frequency, which indicates the diffusion of ions in the solid matrix. The values of Rct for the vanadium oxide alone and graphene-enhanced composite electrodes are about 50.0 and 350.0 Ω for NLVO-1 and LVO-2, respectively. The Rct of the composite electrode is much smaller than that of the LVO electrode. Therefore, the presence of graphene (<2% by weight in this case) in the vanadium oxide composite has dramatically reduced the internal charge transfer resistance and improved the battery performance upon extended cycling. NLVO-1 was subsequently used in two Li-ion cells (one featuring a Li ion reservoir layer and the other not) for evaluation of the effect of a lithium ion reservoir layer on the maximum amount of charges that can be stored in the anode.

The NLVO-based cathode material was formed into a cathode and then combined with a layer of lithiated natural graphite particles or lithiated LiO$_x$ particles (as an anode) that form interstitial spaces to accommodate lithium ion reservoir in the spaces, and a porous separator layer (Celgard 2400) to prepare a lithium-ion battery. A corresponding cell containing no lithium ion reservoir was also prepared for comparison purpose. The electrolyte was a conventional PEO gel electrolyte containing LiPF$_6$ in PC-EC solvent.

Figure 3:
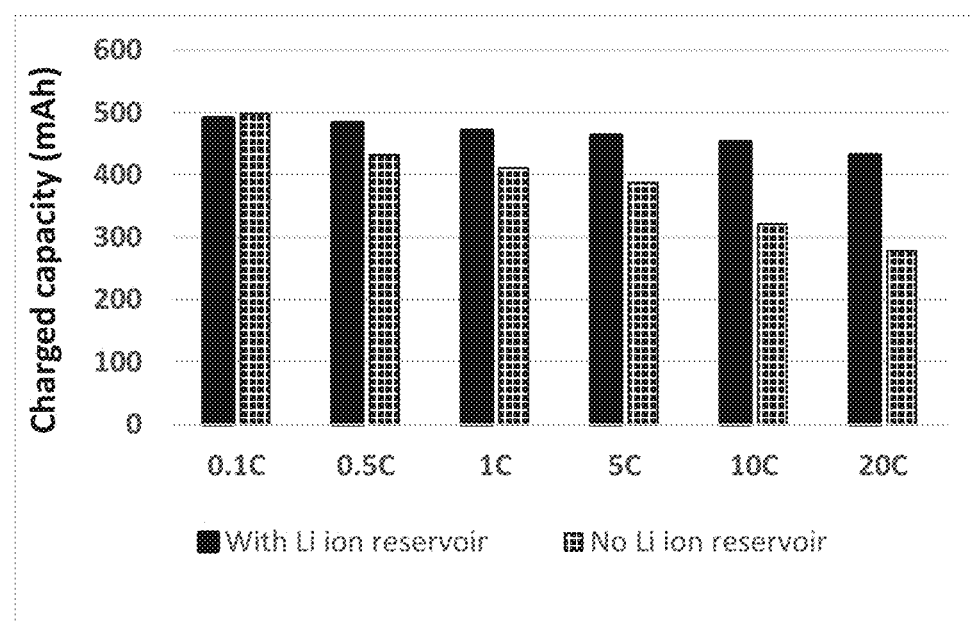
FIG. 3 The actual charge storage capacity values of two cells each containing an anode of lithiated natural graphite particles and a cathode of $GO/Li_xV_3O_8$ nanosheets are plotted as a function of the C rates. One cell contains interstitial space-based lithium ion reservoir, but the other cell does not have such a reservoir.

The capacity of both cells was designed to be approximately 500 mAh in these two pouch cells. The actual charge storage capacity values of these two cells as a function of the charging C rates are summarized in FIG. 3, which clearly demonstrates the surprising effectiveness of the presently invented lithium ion reservoir approach to maintaining a high capacity at very high C rates.

EXAMPLE 7

Relatively Fast-Chargeable Lithium-Ion Batteries Containing Metal Fluoride Nanoparticle-Based Cathode Materials Commercially available powders of CoF$_3$, MnF$_3$, and FeF$_3$ were subjected to high-intensity ball-milling to reduce the particle size down to approximately 0.5-2.3 μm. Each type of these metal fluoride particles, along with graphene sheets (as a conductive additive) and a PVDF binder were made into a cathode electrode on an Al foil surface using the well-known slurry coating and drying procedure.

Several cells, each containing graphene-embraced prelithiated Si particles (supplied by Angstron Energy Co., Dayton, Ohio) as an anode active material and a metal fluoride as a cathode active materials were prepared. The anode active material layers were prepared by first mixing graphene-embraced prelithiated Si (Gn/Si) particles with lithium phosphate (LiPO$_4$) using ball-milling to obtain lithium phosphate-coated Gn/Si particles, which were then mixed with an ionic liquid, having a 1-ethyl-3-methylimidazolium (EMI) cation and an N,N-bis(trifluoromethane) sulphonamide (TFSI) anion. The resulting mixture was heated to 100° C. and impregnated into pores of a layer of Cu foam to make an anode active material layer. On a separate basis, lithium aniline sulfonate, instead of the ionic liquid, was used as the lithium ion-capturing species). Baseline Li-ion cells containing no lithium ion-capturing fluid in the interstitial spaces were also prepared and tested for comparison.

Figure 4:
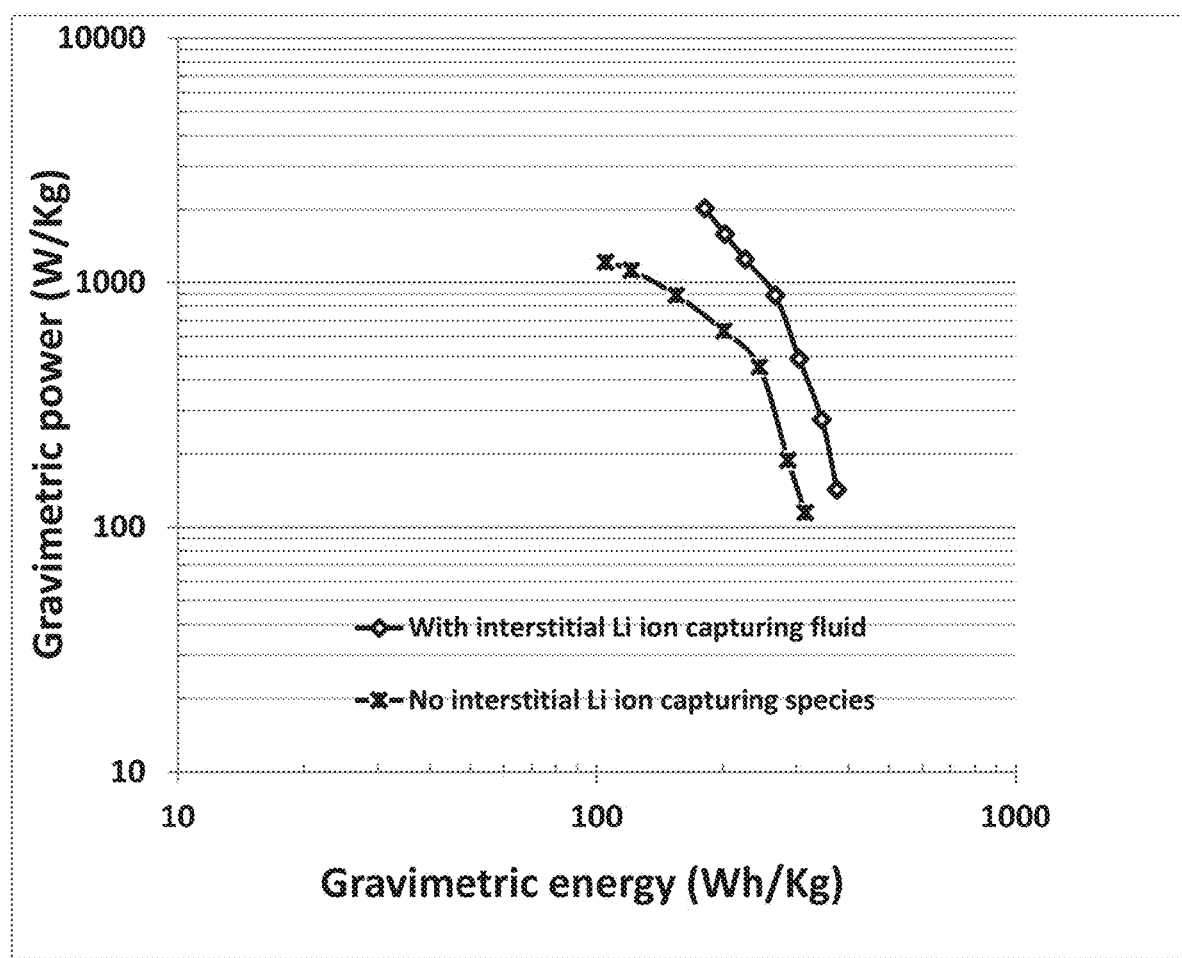
FIG. 4 Ragone plots (power density vs. energy density) of two lithium-ion cells each containing prelithiated Si particles as the anode active material: one cell contains interstitial space-based lithium ion-capturing fluid and the other not.

FIG. 4 shows the Ragone plots (power density vs. energy density) of two lithium-ion cells each containing prelithiated Si particles as the anode active material. The cell that contains interstitial space-based lithium ion-capturing fluid exhibits significantly higher energy densities at higher power densities (i.e. more rate capable or more fast-chargeable) as compared to the cell having no interstitial space-based lithium ion reservoir.

The invention claimed is:

1. A method of improving fast-chargeability of a lithium secondary battery containing an anode, a cathode, a porous separator disposed between said anode and said cathode, and an electrolyte, wherein said method comprises packing particles of an anode active material to form an anode active material layer having interstitial spaces and disposing a lithium ion reservoir in said interstitial spaces, configured to receive lithium ions from said cathode through said porous separator when said battery is charged and to enable said lithium ions to enter said particles of anode active material in a time-delayed manner, wherein said lithium ion reservoir comprises lithium-capturing groups dispersed in a fluid residing in said interstitial spaces and said lithium-capturing groups are selected from (a) electron-donating groups interspaced between non-electron-donating groups; (b) anions and cations wherein the anions are more mobile than the cations; (c) an ionic liquid; or (d) a combination thereof, wherein said particles of anode active material are coated with molecules of poly(lithium-4-styrenesulfonate).

2. A method of improving fast-chargeability of a lithium secondary battery containing an anode, a cathode, a porous separator disposed between said anode and said cathode, and an electrolyte, wherein said method comprises packing particles of an anode active material to form an anode active material layer having interstitial spaces and disposing a lithium ion reservoir in said interstitial spaces, configured to receive lithium ions from said cathode through said porous separator when said battery is charged and to enable said lithium ions to enter said particles of anode active material in a time-delayed manner, wherein said electrolyte is a non-flammable quasi-solid electrolyte comprising a lithium salt dissolved in a mixture of a liquid solvent and a liquid additive, wherein said liquid additive, different in composition than said liquid solvent, is selected from tris(trimethylsilyl)phosphite (TTSPi), triallyl phosphate (TAP), ethylene sulfate (DTD), 1,3-propane sultone (PS), propene sultone (PES), alkylsiloxane (Si—O), alkylsilane (Si—C), liquid oligomeric siloxane (—Si—O—Si—), or a combination thereof and said liquid additive-to-said liquid solvent ratio in said mixture is from 5/95 to 95/5 by weight.

3. The method of claim 1, wherein said anode active material layer contains no resin binder that bonds the particles of active material together.

4. The method of claim 1, wherein said step of packing comprises providing an electrically conductive porous layer having pores and impregnating said particles of anode active material and said lithium ion reservoir into said pores of electrically conductive porous layer, wherein anode active material particles are packed to form interstitial spaces to accommodate said lithium ion reservoir therein.

5. The method of claim 4, wherein said electrically conductive porous layer is selected from metal foam, metal web or screen, perforated metal sheet-based structure, metal fiber mat, metal nanowire mat, conductive polymer nanofiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or a combination thereof.

6. The method of claim 1, wherein the lithium-capturing group is selected from a molecule having a core or backbone structure and at least a side group that contains an ionic or electron rich group; wherein the core or backbone structure contains an aryl, heterocycloalkyl, crown etheryl, cyclamyl, cyclenyl, 1,4,7-Triazacyclononayl, hexacyclenyl, cryptandyl, naphtalenyl, antracenyl, phenantrenyl, tetracenyl, chrysenyl, tryphenylenyl, pyrenyl, pentacenyl, single-benzene or cyclic structure, double-benzene or bi-cyclic structure, or multiple-cyclic structure having 3-10 benzene rings and wherein the side group contains $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano, $CF_3$, or $Si(OR)_3$; wherein R is independently selected from methyl, ethyl, isopropyl, n-propyl, alkyl, haloalkyl, cycloalkyl, heterocycloalkyl, aryl, or benzyl; $M^1$ is selected from Li, Na, K, Rb, or Cs; and $M^2$ is selected from Be, Mg, Ca, Sr, or Ba.

7. The method of claim 1, wherein said lithium capturing group contains a salt that is dissociated into an anion and a cation in a liquid medium wherein said salt is selected from $Li_2CO_3$, $Li_2O$, $Li_2C_2O_4$, $LiOH$, $LiX$, $ROCO_2Li$, $HCOLi$, $ROLi$, $(ROCO_2Li)_2$, $(CH_2OCO_2Li)_2$, $Li_2S$, $Li_xSO_y$, $Na_2CO_3$, $Na_2O$, $Na_2C_2O_4$, $NaOH$, $NaX$, $ROCO_2Na$, $HCONa$, $RONa$, $(ROCO_2Na)_2$, $(CH_2OCO_2Na)_2$, $Na_2S$, $Na_xSO_y$, or a combination thereof, wherein X=F, Cl, I, or Br, R=a hydrocarbon group, $0<x\leq1$, $1\leq y\leq4$ and wherein said liquid medium to dissolve the salt contains a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, Hydrofluoro ether (HFE), Trifluoro propylene carbonate (FPC), Methyl nonafluorobutyl ether (MFE), Fluoroethylene carbonate (FEC), Tris(trimethylsilyl)phosphite (TTSPi), Triallyl phosphate (TAP), Ethylene sulfate (DTD), 1,3-propane sultone (PS), Propene sultone (PES), Diethyl carbonate (DEC), Alkylsiloxane (Si—O), Alkyylsilane (Si—C), liquid oligomeric silaxane (—Si—O—Si—), tetraethylene glycol dimethylether (TEGDME), an ionic liquid solvent, or a combination thereof.

8. The method of claim 1, wherein said lithium capturing groups contain an ionic liquid having a cation selected from tetra-alkylammonium, di-, tri-, or tetra-alkylimidazolium, alkylpyridinium, dialkyl-pyrrolidinium, dialkylpiperidinium, tetraalkylphosphonium, trialkylsulfonium, or a combination thereof.

9. The method of claim 1, wherein said lithium capturing groups contain an ionic liquid having an anion selected from $BF_4^-$, $B(CN)_4^-$, $CH_3BF_3^-$, $CH_2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, or a combination thereof.

10. The method of claim 1, wherein said lithium capturing groups contain an ionic liquid having a 1-ethyl-3-methyl-imidazolium (EMI) cation and an N,N-bis(trifluoromethane) sulphonamide (TFSI) anion.

11. The method of claim 1, wherein said borate salt or phosphate salt is selected from lithium bis(oxalate)borate (LiBOB, $LiB(C_2O_4)_2$), lithium bis(malonato)borate (LiBMB), lithium trifluoromethanesulfonimide (LiTFSI), lithium difluoro(oxalate)borate (LiFOB, $LiBF_2(C_2O_4)$), lithium tetraborate ($LiB_4O_7$), a borate oxide ($B_2O_3$)-forming species, lithium phosphate ($LiPO_4$), lithium pyrophosphate ($LiP_2O_7$), lithium triphosphate ($LiP_3O_{10}$), a phosphate oxide ($P_2O_5$)-forming species, or a combination thereof.

12. The method of claim 1, wherein said anode active material is selected from the group consisting of:
  a) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd);
  b) lithiated and un-lithiated alloys or intermetallic compounds of Si, Ge, Sn, Pb, Sb, Bi, Zn, Al, Ti, Ni, Co, or Cd with other elements;
  c) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, Mn, V, or Cd, and their mixtures, composites, or lithium-containing composites;
  d) lithiated and un-lithiated salts and hydroxides of Sn;
  e) lithium titanate, lithium manganate, lithium aluminate, lithium-containing titanium oxide, lithium transition metal oxide;
  f) lithiated and un-lithiated particles of natural graphite, artificial graphite, meso-carbon micro-beads, hard carbon (carbon materials that cannot be graphitized at a temperature higher than 2,500° C.), soft carbon (carbon materials that can be graphitized at a temperature higher than 2,500° C.), needle coke, polymeric carbon, carbon or graphite fiber segments, carbon nanofiber or graphitic nanofiber, carbon nanotube;
  and combinations thereof.

13. The method of claim 1, wherein said particles of anode active material have a size from 10 nm to 1 μm.

14. The method of claim 1, wherein said electrolyte is selected from a non-aqueous liquid electrolyte, polymer gel electrolyte, polymer electrolyte, quasi-solid electrolyte, solid-state inorganic electrolyte, ionic liquid electrolyte, or a combination thereof.

15. The method of claim 1, wherein said electrolyte is a non-flammable quasi-solid electrolyte comprising a lithium salt dissolved in a liquid solvent having a lithium salt concentration from 3.5 M to 14.0 M so that the electrolyte exhibits a vapor pressure less than 0.01 kPa when measured at 20° C., a vapor pressure less than 60% of the vapor pressure of the liquid solvent alone, a flash point at least 20 degrees Celsius. higher than a flash point of the liquid solvent alone, a flash point higher than 150° C., or no flash point.

16. The method of claim 1, wherein said electrolyte comprises a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

17. The method of claim 1, wherein said electrolyte comprises a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

18. A method of improving fast-chargeability of a lithium secondary battery containing an anode, a cathode, a porous separator disposed between said anode and said cathode, and an electrolyte, wherein said method comprises packing particles of an anode active material to form an anode active material layer having interstitial spaces and disposing a lithium ion reservoir in said interstitial spaces, configured to receive lithium ions from said cathode through said porous separator when said battery is charged and to enable said lithium ions to enter said particles of anode active material in a time-delayed manner, wherein said electrolyte is a non-flammable quasi-solid electrolyte comprising a lithium salt dissolved in a mixture of a liquid solvent and a liquid additive having a lithium salt concentration from 1.75 M to 5.0 M so that said electrolyte exhibits a vapor pressure less than 0.01 kPa when measured at 20° C., a vapor pressure less than 60% of the vapor pressure of said liquid solvent alone, a flash point at least 20 degrees Celsius. higher than a flash point of said liquid solvent alone, a flash point higher than 150° C., or no flash point, wherein said liquid additive, different in composition than said liquid solvent, is selected from tris(trimethylsilyl)phosphite (TTSPi), triallyl phosphate (TAP), ethylene sulfate (DTD), 1,3-propane sultone (PS), propene sultone (PES), alkylsiloxane (Si—O), alkylsilane (Si—C), liquid oligomeric siloxane (—Si—O—Si—), or a combination thereof and said liquid additive-to-said liquid solvent ratio in said mixture is from 5/95 to 95/5 by weight, wherein said particles of anode active material are coated with molecules of poly(lithium-4-styrene-sulfonate).

* * * * *